Figure 1:
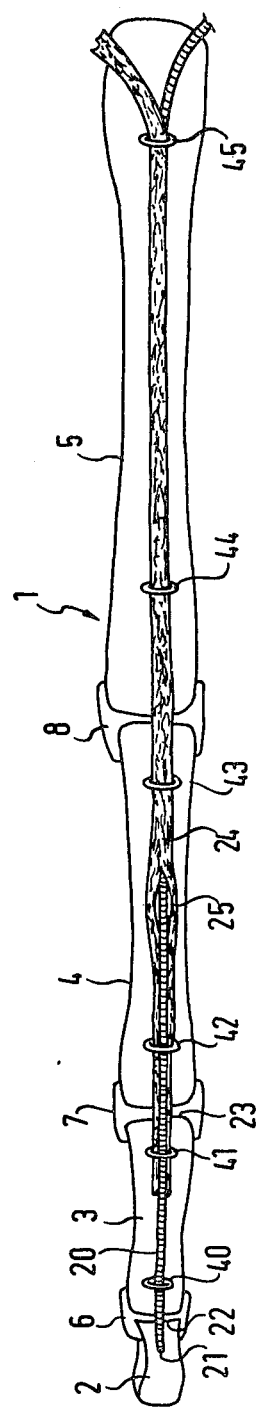

United States Patent [19]

Breiden

[11] Patent Number: 4,466,800

[45] Date of Patent: Aug. 21, 1984

[54] FINGER MODEL
[76] Inventor: Karl Breiden, Kopsbühl 60, D-7730 Villingen, Fed. Rep. of Germany
[21] Appl. No.: 405,956
[22] PCT Filed: Oct. 30, 1981
[86] PCT No.: PCT/DE81/00185
§ 371 Date: Aug. 4, 1982
§ 102(e) Date: Aug. 4, 1982
[87] PCT Pub. No.: WO82/01954
PCT Pub. Date: Jun. 10, 1982
[51] Int. Cl.³ .................... G09B 23/32; A61F 1/06
[52] U.S. Cl. ................................ 434/267; 3/12.7
[58] Field of Search ............... 434/267, 274; 3/1.91, 3/12.6, 12.7

[56] References Cited
U.S. PATENT DOCUMENTS

| 1,501,308 | 7/1924 | Burney | 3/12.6 |
| 2,641,769 | 6/1953 | Robinson | 3/12.7 |
| 2,859,450 | 11/1958 | Becker | 3/12.7 |
| 3,188,753 | 6/1965 | Lovercheck | 434/274 |
| 4,332,570 | 6/1982 | Getty | 434/274 |

FOREIGN PATENT DOCUMENTS

| 841190 | 6/1952 | Fed. Rep. of Germany . |
| 2639143 | 3/1977 | Fed. Rep. of Germany . |
| 2236478 | 2/1975 | France . |

OTHER PUBLICATIONS

*The Journal of Bone and Joint Surgery*, vol. 44B, No. 4, Nov. 1962, "Muscle Function in the Fingers," pp. 899–909.

*Primary Examiner*—William H. Grieb
*Attorney, Agent, or Firm*—Pollock, VandeSande & Priddy

[57] ABSTRACT

A finger model with joints, being connected to each other and corresponding to a respective finger, having tendon-like cords for their movements is so designed that natural finger movements are possible, whereby the model is of particularly simple and clear design. The finger model can be used as finger endoprosthesis or as a demonstration object for the explanation of finger movements and of injuries of the finger movement mechanism.

10 Claims, 6 Drawing Figures

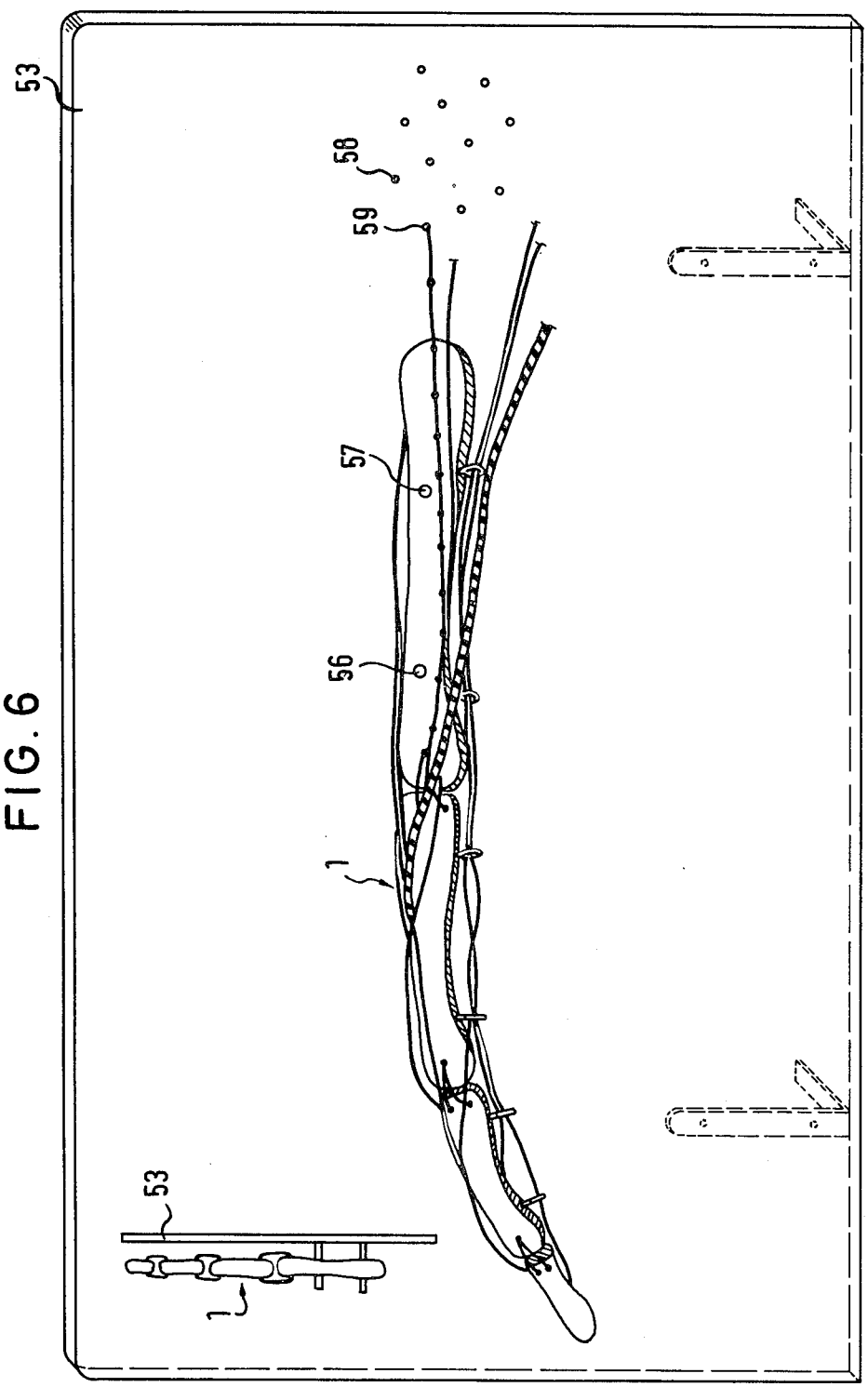

FINGER MODEL

The invention relates to a finger model with joints corresponding to the finger in question, connected with each other and having tendon-like cords attached to its joints for the purpose of moving them.

A finger model of this kind has been described, for instance, in the *Journal of Bone and Joint Surgery*, Vol. 44B, No. 4, November, 1962, 899–909. With this finger model the natural finger movements can only be partially reproduced.

It is the purpose of the invention to provide a finger model of the initially described type, by means of which the natural motions of a finger can be performed and which is suitable for use as endoprosthesis. According to a subsequent development of the invention, it should be possible to demonstrate injuries to the mechanism of finger motions.

The above problem is solved by a finger model of the initially described kind which, according to the invention, is characterized by channel-like guides being provided at the central and/or the proximal phalange and/or the metacarpale at the underside and close to the edges of the articular facets to accept inserted cords. This particular finger model is suited for use as finger-endoprosthesis as well as a demonstration object.

In the following, the invention is described by means of preferred embodiments and taking reference to the drawings.

Figure 5:
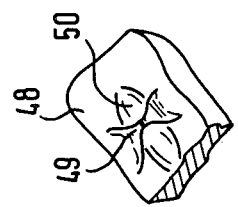
Figure 4:
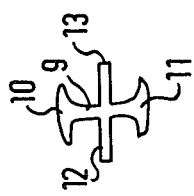
Figure 2:
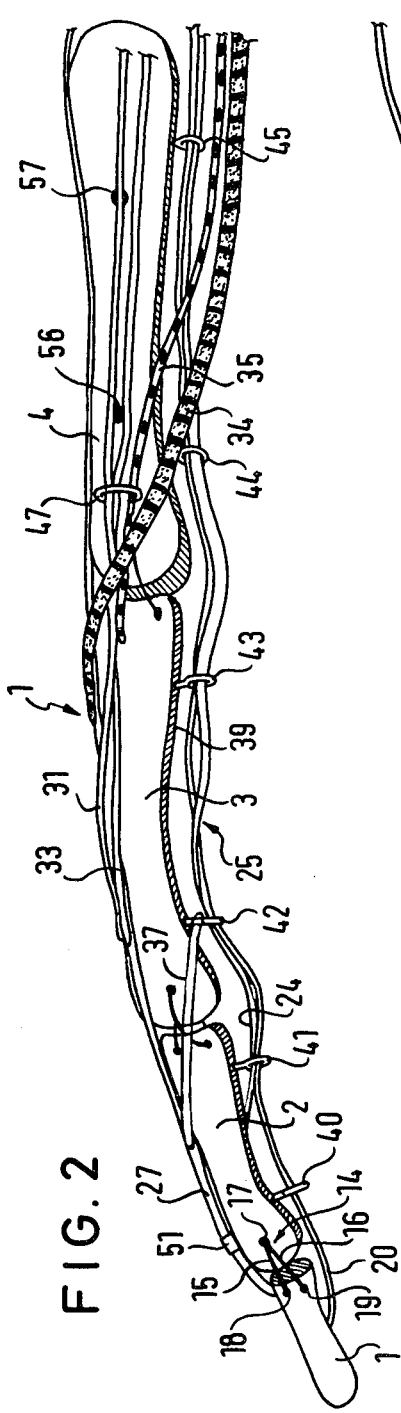
Figure 3:
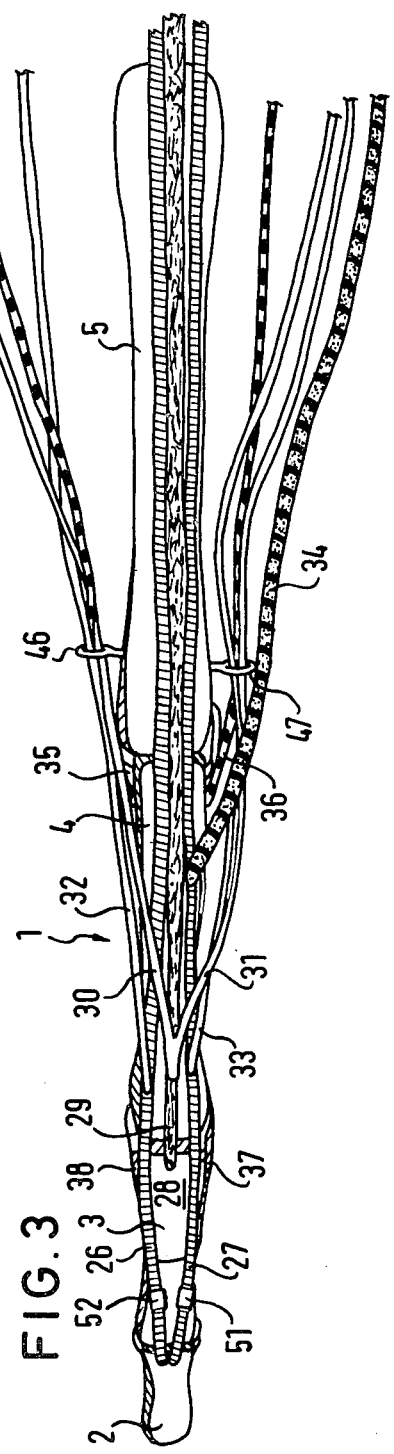

The drawings are as follows:

FIG. 1 a top view of a preferred embodiment of a finger model from below;

FIG. 2 a lateral view of a somewhat modified finger model;

FIG. 3 a top view of the finger model from above;

FIG. 4 a detail of FIG. 1;

FIG. 5 a detail of FIG. 2; and

FIG. 6 a top view of a finger model attached to a demonstration board.

The finger model of the drawings shows, in each case, a median digit consisting of distal phalange 2, central phalange 3, proximal phalange 4 and metacarpale 5. These joints 2, 3, 4, and 5 in the preferred embodiment shown in FIG. 1 are connected by articulations 6, 7, 8 which are known. FIG. 4 is the detailed drawing of the element shown in FIG. 1. It comprises the articular disc 9 itself, located between the opposing articular facets, having double T-shaped transverse walls 10, 11 at the lateral edges of the model. In approximately the center of the articular disc and vertical thereto, pin-shaped projections 12, 13 are provided towards both sides which mate with cylindrical bores (not shown) of the joints to be connected with each other. The joints are preferably made of an elastic synthetic material, of the type which is commercially available, e.g. by the name of SILASTIC. A joint connection of this kind permits movements vertical to the plane of the hand and they are protected against lateral motion.

In the embodiment shown in FIGS. 2 and 3, the articulated connection between two neighboring joints is effected by an articular mechanism 4. The said mechanism has two rings 15, 16, made of strong wire which are taken through a bore 17 forming the rotational axis of the joint, being located at the joint facing the wrist. At the respective adjoining joint to be connected therewith, the rings are preferably taken through two bores 18, 19, being at a distance from each other, as shown in FIG. 2. In this manner, the joints are able to perform articulated motions at a distance from each other, without direct contact of the articular facets and without the insertion of an intermediate articulation.

As can best be seen in FIG. 1, a cord 20, corresponding to the musculus-flexoprofundus tendon is journaled to the underside of the distal phalange 2 at a distance from the rim of the articular facet of the distal phalange. The distance of the fastening point 21 from the rim 22 of the articular facet is about one third of the length of the distal phalange 2. A cord 24, corresponding to the superficialis tendon, is attached to the underside of the central phalange 3 again at a distance of about one third of the total length of the central phalange from the rim 23 of the articular facet lying opposite from the proximal phalange. In the embodiment as shown in FIG. 1, this cord is first designed in two parts and, at about the middle of the proximal phalange provides a passage 25 for the cord 20, hitherto lying above it; it passes through this passage 25 and from that point on runs below the cord 24, so that, at the end of the finger model, cord 24 is above cord 20. This particular embodiment will be chosen especially if the finger model will be used as a demonstration object since in this manner a connection with the pertinent muscles, accurate from the side will be possible. If, however, the finger model is to be used as finger-endoprosthesis, cord 24 may be designed exactly as cord 20 as a simple strand without the passage 25, or the tendon, or, respectively the tendon equivalent of the musculus flexor superficialis can be dispensed with (this would greatly facilitate the surgical procedure without resulting in an undesirable loss in function).

As can best be seen in FIG. 3, a pair of cords 26, 27 affects the upper side of the distal phalange, as close as possible to the rim of the articular facet, said cords being guided across the upper sides of the subsequent joints. This pair of cords corresponds to the lateral rein of the extensor digitorum communis. Immediately at the rim 23 of the central phalange located opposite the proximal phalange, a cord 29 is held, at the upper surface 28 of the central phalange 3, and in its middle, corresponding to the middle rein of the extensor digitorum communis. The said cord 29 branches into two cord parts 30, 31, which correspond to the attachments of the musculus interosseus at the central rein of the musculus extensor digitorum communis and which are guided downward from the upper side to the respective lateral areas and are taken towards the rear, along the lateral areas, parallel to the axis of the finger.

Corresponding to the attachment of the muscle interosseus at the central rein of the muscle extensor digitorum communis, cord parts 30, 31 affect cord 29. These are taken downward along the sides of the proximal phalange and along the sides of the metacarpale, parallel to the finger axis and towards the rear. Cords 26 and 27 are affected by cord parts 32, 33, which correspond to the attachments of the muscle interosseus at the lateral rein, said cord parts being guided from the upper side towards the lateral areas and down, and along the sides parallel to the finger axis towards the rear. Attached at a first end thereof to the upper surface of the proximal phalange and corresponding to the musculus lumbricalis is a cord 34 which operates differently from the other cords because is not constrained to a direction parallel to the finger axis. Rather, it partially wraps around the finger model allowing free lateral and volar movement thereof. Finally, cords 35, 36 which correspond to the attachment of the musculus interosseus at the proximal phalange attach close to the end of the proximal phalange lying opposite the metacarpale at both sides at the top (see also FIG. 2), said cords running laterally past the metacarpale, parallel to the finger axis and towards the rear.

As can best be seen from FIGS. 2 and 3, each of the cords 26, 27 is connected with a cord 37, 38 corresponding to the retinacular ligament (Landsmeer). These two cords run past the sides towards the underside 39 of the proximal phalange and are fastened to that underside at a distance from the articular facet facing the central phalange.

Channel-like guides 40–46 are provided at the central phalange 3, the proximal phalange 4 and the metacarpale 5, located at the underside, close to the frontal area of these joints, forming their articular facets.

In addition, as can be seen from FIGS. 2 and 3, at the sides of the metacarpale close to the end facing the proximal phalange, corresponding channel-like guides 46, 47 are provided. If the finger model is to be used as a demonstration object, these channel-like guides preferably are designed as oval eyelets attached to the underside of the joints or, respectively, the sides of the metacarpale, as is best illustrated in FIGS. 1 to 4 and 6. These may, as an example, be screwed into the joints. If, however, the finger model is to be used as prosthesis to replace a finger, the channel-like guides are preferably designed as one piece with the joints. FIG. 5 shows part of such a joint with such a channel-like guide. Formed as one piece with the body 48 of the respective joint, a kind of bridge 49 is provided at the location corresponding to the channel-like guide, which forms the channel and through which the cords run. Underneath the bridge 49, the body 48 may have an indentation 50 extending vertically to the bridge, facilitating the introduction and the sliding of the cords.

When using the model as a prosthesis, a continuous channel-like guide across the entire length of the individual phalanges is possible (in the sense of a continuous tendon sheath).

The cords 37, 38 corresponding to the retinacular ligament, as can be seen in FIG. 2, are preferably fastened to the lower channel 42 of the proximate phalange facing the central phalange.

If the finger model is to be used as prosthesis, the joints 2 to 5 are preferably manufactured of a ceramic material or a hard synthetic, as if they are being used for hip joint prostheses. The channel-like guides are formed in one operation simultaneously with the manufacture of the joints.

All attachments of tendon reins are also combined with the joints, and possibly also in one single manufacturing operation. The tendons themselves are manufactured from compatible synthetic tissue such as is being used in body implants. These "synthetic tendons" are then connected with the proximal (body) natural tendon ends by means of suitable suture materials and suture techniques so that practically at once after the surgical intervention the natural finger movements can be performed.

When using the finger model as endoprosthesis, a tested, so-called "artificial socket" which is commercially available can be used to replace an articulation—similar to the socket mechanism shown in FIG. 4. In any case, lateral stability must be achieved in the sense that no deviations from the longitudinal axes are possible.

With regard to so-called long-range results after replantation surgery which can restore total function only in the most exceptional cases, there exist all kinds of degrees of limited function to a useless, stiff and therefore unusable and bothersome finger, with very long times of inability to work and usually requiring several surgical measures, spread over certain time intervals.

The use of the described endoprosthesis is particularly suitable for so-called acute hand injuries in which either one or several fingers have been severed completely or in part and which are nearly always accompanied by a fracture of one or several phalanges, combined with a substantive defect of all finger elements. In this case, the skin layer is preserved—to the extent it has been saved—and, if needed, known micro-surgical techniques are applied for the reconstruction of vessels and nerves; then, a fitting endoprosthesis is inserted into the skin layer and all tendon ends of the prosthesis are connected with the proximal natural tendon ends.

If the natural layer of skin is no longer available or is no longer usable, the following technique is to be applied: the endoprosthesis is connected with the proximal tendon ends, as described, and the endoprosthesis is then covered with skin by means of the so-called tubed flap technique. In a later surgical intervention, sensitive skin areas can be transplanted to the fingertips.

An additional use relates to replanted fingers which are seriously hampered in their function and which usually are very painful. In this case, a replacement by the endoprosthesis is possible.

In case the finger model is to be used in a demonstration, each of the cords in each VERDAN-zone has a device 51, 52 for the severing and re-connection of the cord in this zone. In FIGS. 2 and 3 the cords 26, 27 have such devices 51, 52. The remaining elements in the individual VERDAN-zones have been omitted in the drawing. These severing points permit a simulation of injuries and to demonstrate their effects. Elements 51, 52 can be designed in various ways. For instance, the two sections of the cords may be connectable by means of snaps. It is also possible to select a screw and sleeve connection.

A demonstration board 53 is provided so that the finger model can be used as a demonstration object, said board having cylindrical pins, protruding upwards and being arranged at a distance from each other. At its underside, (see FIG. 1) the metacarpale has bores 54, 55, their distance from each other corresponding to the distance of the pins, and their interior diameter being somewhat greater than the outer diameter of the pins. In addition, corresponding bores 56, 57 are provided at the two opposite lateral walls of the metacarpale. These bores make it possible to slip the metacarpale onto the holding pins on the demonstration board. By pulling the individual cords, the sequence of the motion and the effect of the individual cords can be demonstrated. Holding pins 58, 59 may be provided on the demonstration board, to which the individual cords can be fastened. It is also possible to connect the ends of the cords with individually motor driven shafts and to demonstrate a coordinated motion sequence by means of a suitable control program.

I claim:

1. An artificial finger having central and proximal phalanges and a metacarpale arranged with opposing articular facets therebetween defining corresponding joints, the finger further comprising:

- a plurality of tendon-like cords connected to the phalanges and the metacarpale in the vicinity of the joints for achieving movement thereat;
- a plurality of cord receiving channel-like guides provided at the underside of the phalanges and metacarpale and arranged proximate the rims of the articular facets; and
- a further cord attached to the upper surface of the proximal phalange and partially wrapped around the finger for allowing free lateral and volar movement thereof.

2. Finger model as claimed in claim 1, characterized by the distance of the guides from the rims of the articular facets being chosen so that each of two inter-connected joints are able to perform a relative movement of at least 90° about the articular axis.

3. Finger model as claimed in claims 1 or 2, characterized by a channel-like guide to accept cords being provided at each side of the metacarpale.

4. Finger model as claimed in one of the claims 1 or 2, characterized by a retinacular ligament being fastened to the proximate phalange.

5. Finger model as claimed in one of the claims 1 or 2, characterized by the connection of two adjoining joints being effected by means of two elements, passing through an articulate socket along its rotational axis and affecting the articulate socket at two points, the articulation being rotatable about the rotational axis.

6. Finger model as claimed in claim 5, characterized by the elements being annular in design.

7. Finger model as claimed in one of the claims 1, 2 or 6 characterized by at least one of the cords having a severing point with a mechanism for re-connection.

8. Finger model as claimed in claim 7, characterized by the cords in each VERDAN-zone having a severing point with a mechanism for re-connection.

9. Finger model as claimed in one of the claims 1, 2, 6 or 8, characterized by the metacarpale having elements for attachment to a holding arrangement.

10. Finger model as claimed in claim 9, characterized by the elements being designed as holes to accept pins.

* * * * *